No. 640,087. Patented Dec. 26, 1899.
W. A. BRANTLEY.
COMBINED HARROW AND CULTIVATOR.
(Application filed Feb. 20, 1899.)
(No Model.) 2 Sheets—Sheet 1.
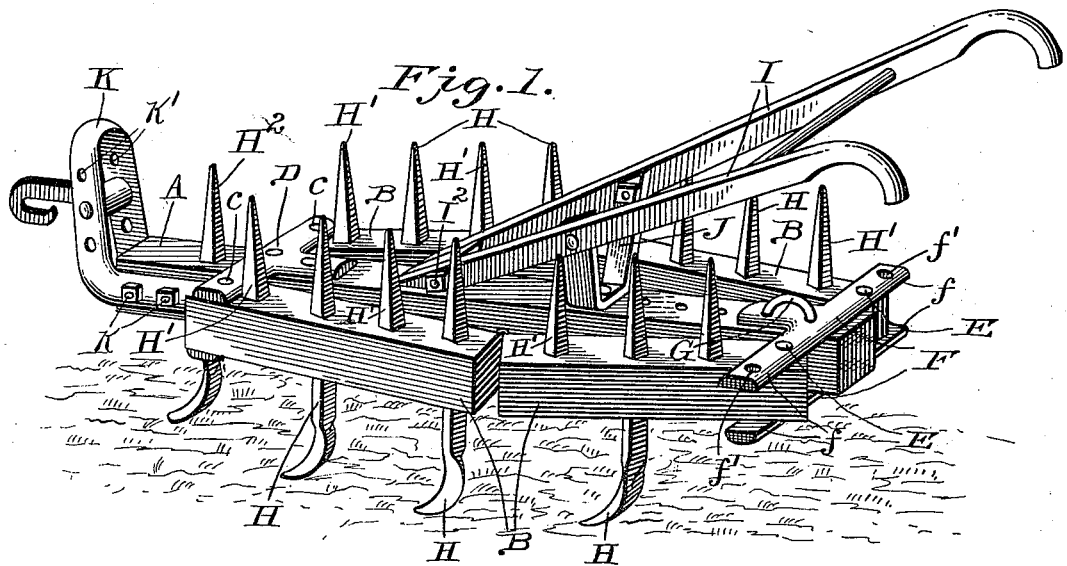
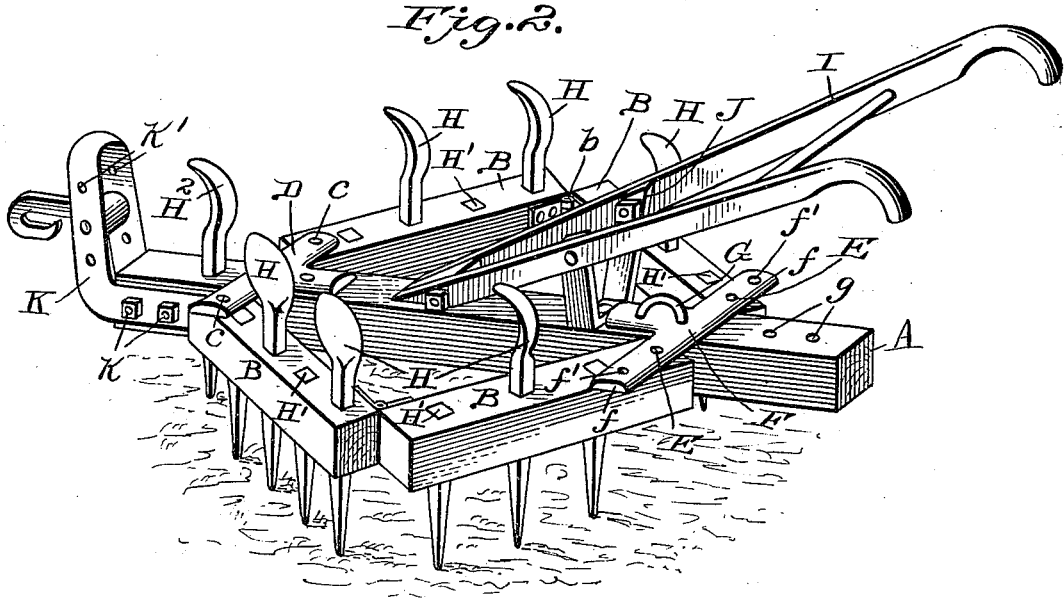
WITNESSES:
Edwin S. McKee
Geo. M. Anderson
INVENTOR
W. A. Brantley
BY
E. W. Anderson
ATTORNEY.

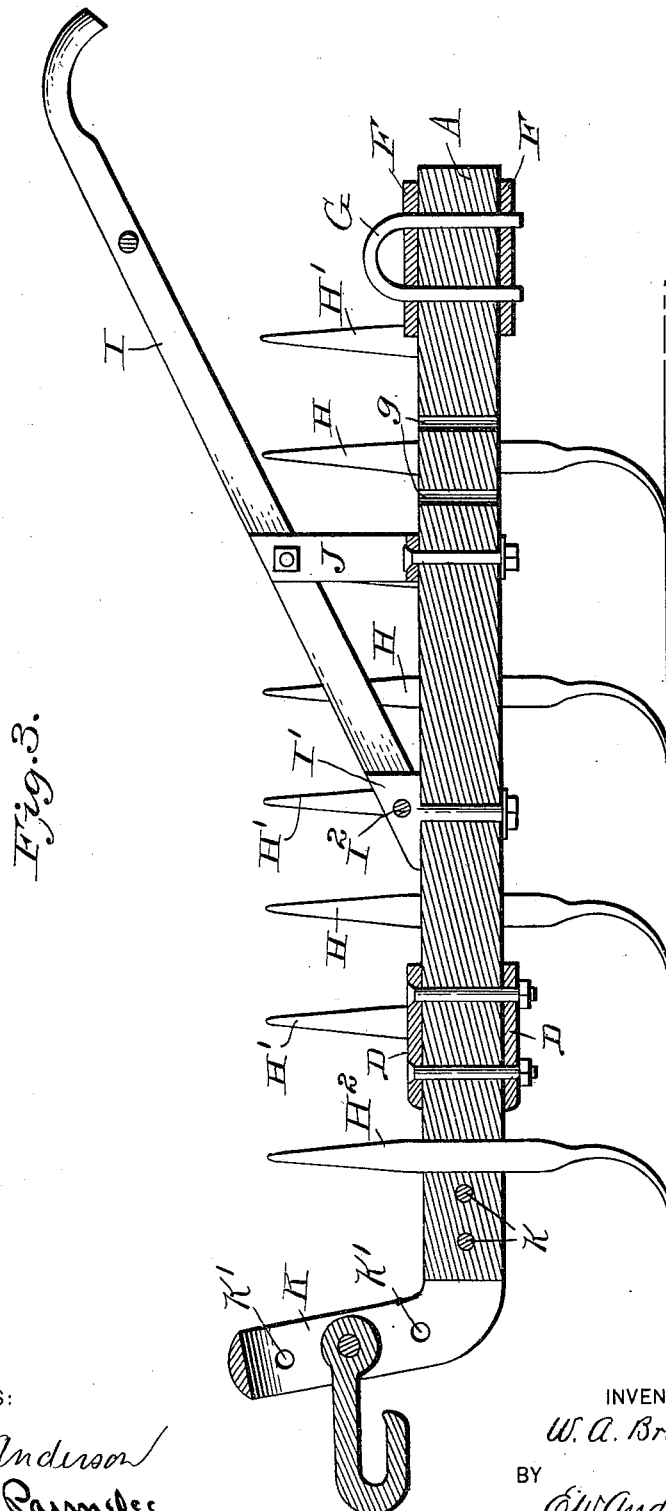

UNITED STATES PATENT OFFICE.

WILLIAM A. BRANTLEY, OF AULANDER, NORTH CAROLINA.

COMBINED HARROW AND CULTIVATOR.

SPECIFICATION forming part of Letters Patent No. 640,087, dated December 26, 1899.

Application filed February 20, 1899. Serial No. 706,160. (No model.)

*To all whom it may concern:*

Be it known that I, WILLIAM A. BRANTLEY, a citizen of the United States, and a resident of Aulander, in the county of Bertie and State of North Carolina, have invented certain new and useful Improvements in a Combined Harrow and Cultivator; and I do declare the following to be a full, clear, and exact description of the invention, such as will enable others skilled in the art to which it appertains to make and use the same, reference being had to the accompanying drawings, and to letters of reference marked thereon, which form a part of this specification.

Figure 1 of the drawings is a perspective view of harrow and cultivator extended for use as a cultivator. Fig. 2 is a similar view showing invention as adapted for use as a harrow. Fig. 3 is a central vertical longitudinal section of the invention.

This invention is designed to provide a combined harrow and cultivator of improved character; and it consists in the novel construction and combination of parts, all as hereinafter described, and pointed out in the appended claim.

The frame of my combined cultivator and harrow is of diamond shape, as shown in the accompanying drawings, and is formed by a central longitudinal beam A and lateral or wing portions B, each of which is formed in two sections connected by a hinge $b$. The forward portions or sections are connected to the beam A by means of vertical pivot-bolts $c$, which pass through their end portions and also through upper and lower T plates or irons D, which are bolted to the central beam and extend laterally thereof. The after sections of the frame portions B are secured by pivot-bolts E to similar upper and lower T plates or irons F, which are adapted to be moved back and forth upon said beam, being secured in the desired adjustment by means of a double or inverted-U-shaped pin G. This beam is provided with a series of holes $g$ for this pin, and the laterally-extending arms of the plates or irons F are provided with additional holes $f$ to permit lateral adjustment of the rear ends of the after sections of the frame portions B.

H H' designate the teeth which are seated in the portions B, with the exception of one tooth H, which is seated in the central beam A in front of the forward ends of the portions B. The teeth H are long teeth which pass entirely through the said frame portions, one end portion thereof constituting an ordinary harrow point or tooth and the other end portion a cultivator tooth or share. The teeth H' are short harrow-teeth which are placed intermediately of the teeth H.

I designates the handles, whose lower forward ends are detachably secured to the central beam A by any suitable means, as by a flattened bolt I, passing vertically through the beam and having its projecting upper end portion provided with an aperture, through which is passed a bolt $I^2$, which also passes through the handles. The handles are also braced or supported by means of an angular bracket J, which is detachably secured to the central beam.

Attached to the forward end of the beam by means of removable bolts $k$ is an upwardly-extending forwardly-inclined clevis or draft-loop K, provided with holes $k'$ at a number of different points for changing the draft connection.

As shown in Fig. 1, the implement is adapted for use as a cultivator, the frame portions B being but slightly spread. Fig. 2 shows the adaptation as a harrow, the wing portions being bowed out on their hinges, which is effected by sliding the T plates or irons F forwardly on the beam A. The teeth are also reversed. This may be accomplished in two ways: First, the handles, the supporting-bracket therefor, and the clevis device may be detached, the entire frame inverted, and the handles, bracket, and clevis fastened to the other side thereof, or, second, the bolts which secure the frame portions B may be removed and said portions be inverted and resecured. In this case the single tooth in the forward portion of the central beam should be removed from the beam and replaced in inverted position.

By the above-described construction and combination I provide two implements in one at a cost but little in excess of the cost of either one if separately constructed and which can be readily and quickly converted from one form to the other. The construction is, moreover, a strong and durable one, is of simple character, and is such as to readily permit the necessary adjustments.

Having thus described my invention, what I claim as new, and desire to secure by Letters Patent, is—

The herein-described combined harrow and cultivator, comprising a central beam perforated at its rear portion, the T-plates secured to the front and rear portions of said beam, the plate at the rear portion being adjustable longitudinally thereon, the U-shaped bolt which secures said plate, the centrally-hinged side beams pivotally and detachably secured at their ends to the said T-plates, means whereby the point of connection with the rear T-plate may be adjusted laterally, the long teeth in said beams having harrow-points at one end and cultivator-points at the opposite end, and the short harrow-pointed teeth intermediate of the long teeth, substantially as specified.

In testimony whereof I affix my signature in presence of two witnesses.

WILLIAM A. BRANTLEY.

Witnesses:
J. A. DUNNING,
A. J. DUNNING.